(12) United States Patent
Jaffee

(10) Patent No.: US 9,144,955 B2
(45) Date of Patent: Sep. 29, 2015

(54) BLENDED THERMOPLASTIC AND THERMOSET MATERIALS AND METHODS

(71) Applicant: Alan Michael Jaffee, Bowling Green, OH (US)

(72) Inventor: Alan Michael Jaffee, Bowling Green, OH (US)

(73) Assignee: Johns Manville, Denver, CO (US)

( * ) Notice: Subject to any disclaimer, the term of this patent is extended or adjusted under 35 U.S.C. 154(b) by 91 days.

(21) Appl. No.: 14/017,529

(22) Filed: Sep. 4, 2013

(65) Prior Publication Data
US 2015/0064392 A1   Mar. 5, 2015

(51) Int. Cl.
| B32B 37/00 | (2006.01) |
| B32B 5/12 | (2006.01) |
| B32B 5/26 | (2006.01) |
| B32B 5/02 | (2006.01) |
| B32B 37/04 | (2006.01) |
| B32B 37/12 | (2006.01) |
| B32B 38/08 | (2006.01) |
| B32B 38/00 | (2006.01) |

(52) U.S. Cl.
CPC . *B32B 5/12* (2013.01); *B32B 5/022* (2013.01); *B32B 5/26* (2013.01); *B32B 37/04* (2013.01); *B32B 37/12* (2013.01); *B32B 38/08* (2013.01); *B32B 2038/0076* (2013.01); *B32B 2250/02* (2013.01); *B32B 2255/26* (2013.01); *B32B 2262/101* (2013.01); *B32B 2262/14* (2013.01); *B32B 2307/712* (2013.01); *B32B 2419/00* (2013.01); *B32B 2607/00* (2013.01); *Y10T 442/67* (2015.04); *Y10T 442/697* (2015.04)

(58) Field of Classification Search
CPC ........ B32B 5/26; B32B 5/12; B32B 37/1284; B32B 38/08; B32B 2260/048; B32B 2262/14; B29C 70/46; B29C 66/7212; D04H 1/60; D04H 1/645; D04H 13/002; D04H 13/006
USPC ......... 156/62.8, 307.1, 307.5, 307.7; 264/258
See application file for complete search history.

(56) References Cited

U.S. PATENT DOCUMENTS

| 3,779,851 | A | * | 12/1973 | Hertz ............................ 156/182 |
| 4,543,288 | A | | 9/1985 | Radvan et al. |
| 4,690,860 | A | | 9/1987 | Radvan et al. |
| 4,734,321 | A | | 3/1988 | Radvan et al. |
| 4,889,764 | A | * | 12/1989 | Chenoweth et al. .......... 442/342 |
| 5,053,449 | A | | 10/1991 | Biggs et al. |
| 5,393,379 | A | | 2/1995 | Parrinello |
| 5,417,785 | A | * | 5/1995 | Baigas, Jr. ................... 156/62.2 |
| 5,688,851 | A | * | 11/1997 | Kress ............................ 524/430 |
| 7,476,350 | B2 | * | 1/2009 | Allen ........................... 264/40.1 |

FOREIGN PATENT DOCUMENTS

| WO | 2005044531 A2 | 5/2005 |
| WO | 2005100708 A2 | 10/2005 |
| WO | 2010021611 A1 | 2/2010 |

* cited by examiner

*Primary Examiner* — John Goff
(74) *Attorney, Agent, or Firm* — Robert D. Touslee

(57) ABSTRACT

Structural panels and methods of making composite material for such structural panels may include applying a resin to a nonwoven fibrous web, where the nonwoven fibrous web includes a combination of glass fibers and polymer fibers. The web may be dried at a first stage temperature at or below a curing temperature of the resin for a time sufficient to substantially dry but not substantially cure the resin. The web may be laminated at a second stage temperature sufficient to fully cure the resin to produce a composite material. The second stage temperature may be above the melting point of the polymer fibers, and the resin may cause the composite material to retain a substantially rigid shape upon completion of the laminating operation.

17 Claims, 2 Drawing Sheets

BLENDED THERMOPLASTIC AND THERMOSET MATERIALS AND METHODS

FIELD OF THE TECHNOLOGY

The present technology encompasses materials and methods related to building materials. More specifically, the present technology encompasses blended thermoplastic and thermoset pre-impregnated materials using wet laid nonwoven fabrics for use in building materials.

BACKGROUND

Structural panels are used for a variety of building installations in both residential and commercial contexts. Structural panels may provide building integrity as well as protection from the elements based on the materials of the panels. Structural panels may be manufactured from various materials including woods, foams, insulations, and/or composite materials.

Structural panels may also be used in recreational vehicles or mobile homes. In such instances, the panels may be required to perform a variety of functions including providing elemental integrity, structural integrity, as well as providing aesthetic pleasure to the occupants. Conventional panels may include luan plywood layers about a foam core to provide the majority of protection. Unfortunately, such panels may not provide adequate protection despite their relatively low cost. For example, if leaks form in the outer shell of the wall, water may penetrate the panel and soak the plywood causing a variety of issues including mold and mildew. Additionally, the panels may warp affecting both the structural integrity and aesthetic pleasure of the vehicle for any occupants.

Thus, there is a need for improved methods and systems for producing structural panels and composite materials for use in structural panels. These and other needs are addressed by the present technology.

BRIEF SUMMARY

The present technology encompasses structural panels and methods of making structural panels utilizing composite material. The methods of making composite material for such structural panels may include applying a resin to a nonwoven fibrous web, where the nonwoven fibrous web includes a combination of glass fibers and polymer fibers. The web may be dried at a first stage temperature at or below a curing temperature of the resin for a time sufficient to substantially dry but not substantially cure the resin. The web may be laminated at a second stage temperature sufficient to fully cure the resin to produce a composite material. The second stage temperature may be above the melting point of the polymer fibers, and the resin may cause the composite material to retain a substantially rigid shape upon completion of the laminating operation.

The nonwoven fibrous web may account for greater than 50% by weight of the composite material. The glass fibers of the nonwoven fibrous web may account for greater than 40% by weight of the composite material in disclosed embodiments. The nonwoven fibrous web may be characterized by a machine direction to cross machine direction tensile ratio of below or about 2 to 1. Additionally, the methods may further comprise applying a gel coat to a surface of the laminated web to produce a Class A finish for the composite material. The application of the gel coat may include coupling a layer of material to a surface of the laminated web, and saturating the layer of material with the gel coat. The gel coat may further extend beyond the thickness of the layer of material in disclosed embodiments, and the layer of material may include nonwoven glass fiber material. The methods may still further include coupling a layer of the composite material to opposite sides of a core material to produce a structural panel. In disclosed embodiments the laminating operation may also include laminating at least two layers of web together to form the composite material, and at least one of the at least two layers may have a fiber directional orientation orthogonal to at least another of the at least two layers. An additional layer of material may also be coupled to a surface of this multilayered laminated web, and then subsequently saturated with a gel coat.

Structural panels are also encompassed by the technology and may include a core material and the nonwoven laminated material. A first surface of the nonwoven laminated material may be coupled with a first surface of the core material in disclosed embodiments. The nonwoven laminated material may include a nonwoven fibrous web including a combination of glass fibers and polymer fibers as well as a B-staged resin characterized by a curing temperature above the melting temperature of the polymer fibers. The structural panels may further include an additional layer of the nonwoven laminated material coupled with a second surface of the core material opposite of the first surface core material.

The structural panels may also include a gel coat applied to a second surface of the nonwoven laminated material opposite the first surface of the nonwoven laminated material coupled with the core material. In disclosed embodiments the structural panels may further include a reinforcement layer coupled with the second surface of the nonwoven laminated material and the gel coat may saturate the reinforcement layer. The gel coat may also extend beyond the thickness of the reinforcement layer from the nonwoven laminated layer to provide a Class A finish to the structural panel. The nonwoven laminated material may include at least two layers of the nonwoven fibrous web laminated together, and at least one layer of the at least two layers of the nonwoven fibrous web may have a fiber directional orientation orthogonal to at least one other layer of the nonwoven fibrous web. In disclosed embodiments the nonwoven fibrous web of the structural panels may be characterized by a machine direction to cross machine direction tensile ratio of below or about 2 to 1.

Such technology may provide numerous benefits over conventional techniques. For example, improved structural integrity and weather resistance may be afforded by the components of the composite material. Additionally, production costs may be decreased from the incorporation of certain lower-cost compositional materials. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

When manufacturing laminated materials that include polymeric components, the lamination process may cause deformation of the materials produced. For example, the lamination operation may occur at a temperature or a temperature/pressure combination above the softening or melting temperature of the polymeric component. Performance of the lamination process may produce a composite material, however when the composite is removed from the lamination device, for example, the incorporated polymeric components may still be in a melted or softened state. Depending on the extent of incorporation of the polymeric components, the produced composite may sag or otherwise deform based on the still-fluid nature of the polymers. After the polymer has cooled sufficiently to set, however, remedying the deformation may prove difficult if not impossible. Accordingly, the present technology includes mechanisms for overcoming the effects of incorporated polymeric components that may be in a melted state.

The present technology encompasses structural panels and methods of making structural panels utilizing composite material. The methods of making composite material for such structural panels may include applying a resin to a nonwoven fibrous web, where the nonwoven fibrous web includes a combination of glass fibers and polymer fibers. The web may be dried at a first stage temperature at or below a curing temperature of the resin for a time sufficient to substantially dry but not substantially cure the resin. Such drying may allow the resin to flow in a thermoplastic manner to bond the fibers to allow for winding and subsequent handling prior to any final curing operation. The web may be laminated at a second stage temperature sufficient to fully cure the resin to produce a composite material. The second stage temperature may be above the melting point of the polymer fibers, and the resin may cause the composite material to retain a substantially rigid shape with no cooling or minimal cooling upon completion of the laminating operation.

Figure 1:
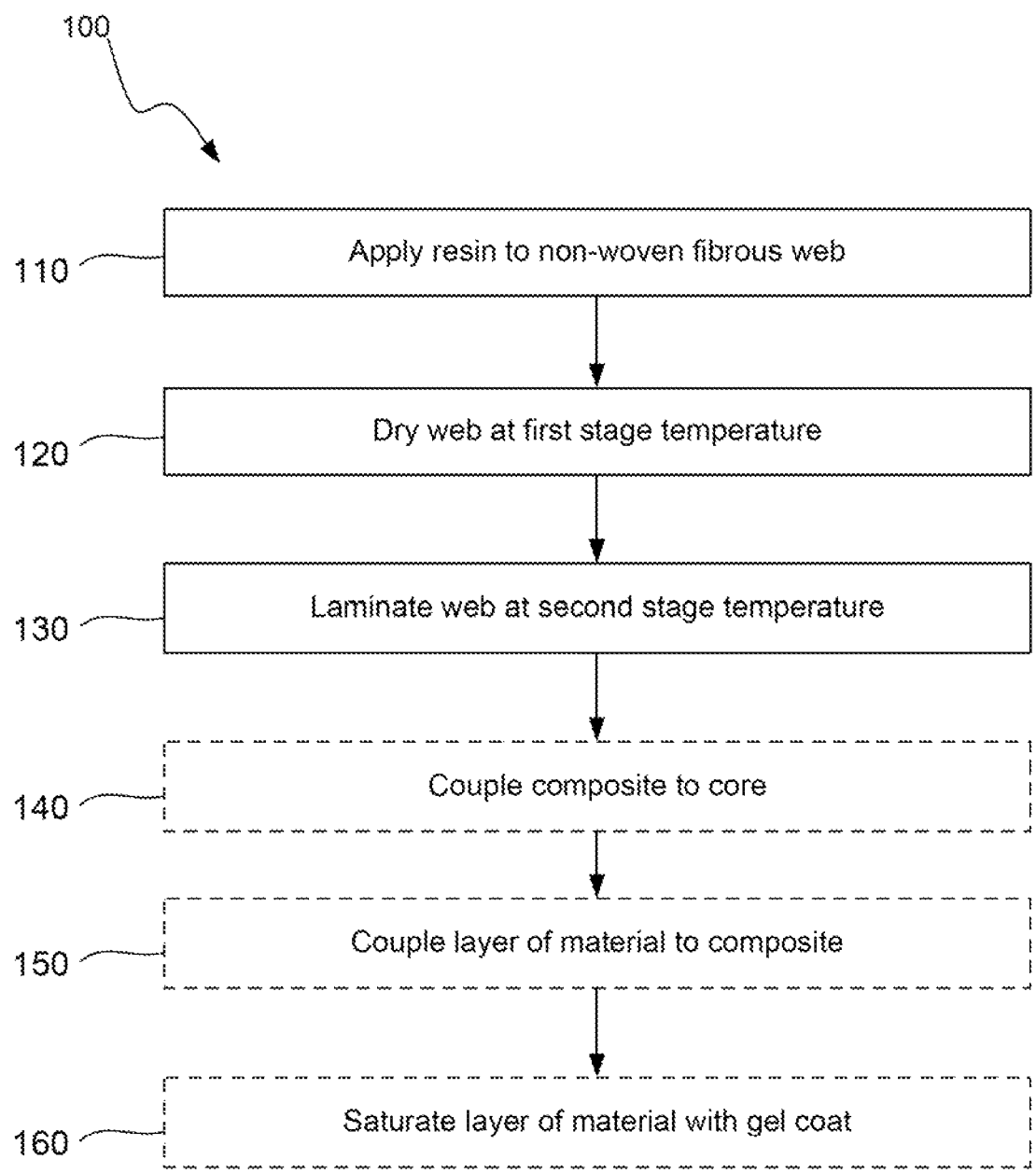
FIG. 1 illustrates a method of making a composite material for use in a structural panel according to embodiments of the present technology.

Referring now to FIG. 1, a method 100 is illustrated for making a composite material for use in a structural panel according to embodiments of the present technology. With the formed composite material, structural panels may be produced as described by the method. The method may include applying a resin to a nonwoven fibrous web in operation 110. The nonwoven fibrous web may include a combination of glass fibers and polymer fibers as well as additional components as may be described below. The web including the resin may be dried at a first stage temperature that may be at or below a curing temperature of the resin for a time sufficient to substantially dry but not substantially cure the resin at operation 120. The web may then be laminated at a second stage temperature that is sufficient to fully cure the resin to produce the composite material in operation 130. The second stage temperature may be above the melting point or softening point of the polymer fibers included in the nonwoven web. The resin used in the composite may be configured to cause the composite material to retain a substantially rigid shape upon completion of the laminating operation. The laminated and fully formed composite may then be used to produce structural panels as will be described in further detail below.

The nonwoven fibrous web to which a resin may be applied in operation 110 may be made in a variety of processes including wetlaid processes, airlaid processes, crosslapping processes, as well as spunlaid processes, and other processes that may be useful to produce the described composites. The process used to form the nonwoven web may be selected based on fiber size and other useful criteria as would be understood. In disclosed embodiments a wetlaid process is utilized to produce the fibrous web. The fibers used in the web may include glass fibers and polymer fibers in combination, but may additionally include natural fibers, ceramic fibers, mineral wool, carbon fibers, cellulosic fibers, as well as other fibers that may be useful in the described composites.

The glass fibers may include E glass, C glass, T glass, S glass, A glass, R glass, among other types of glass. The polymer fibers utilized may include one or both of natural or synthetic polymers. Exemplary polymer fibers may include polyamides, polycaprolactams, aromatic or partially aromatic polyamides, aliphatic polyamides such as nylon, aliphatic polyester, partially aromatic or fully aromatic polyesters, polyphenylene sulfides, polymers with ether- and keto- groups, polyolefins, cellulose, and/or polybenzimidazoles, among other polymers. For example, polyolefins that may be utilized as the polymer fibers may include thermoplastic polyolefins including polyethylene, polypropylene, polymethylpentene, among other polyesters and polyolefin elastomers as would be understood by those in the art.

The ratio of polymer fibers to glass fibers in the composites may vary in disclosed embodiments, however the produced composites generally include a majority by weight of glass fiber compared to polymer fiber. Glass fibers may account for greater than or less than about 50% of the total composite components by weight. For example, glass fibers may account for greater than about 40%, or between about 20% and about 70% by weight of the composite, about 30% and about 70%, about 40% and about 60%, about 40% and about 50%, about 40% and about 45%, or any specific percentage within any of these stated ranges. Polymer fibers may account for greater than or less than about 40% of the total composite components by weight. For example, polymer fibers may account for between about 1% and about 40% by weight of the composite, about 10% and about 40%, about 20% and about 40%, about 25% and about 30%, or any specific percentage within any of the stated ranges. In disclosed embodiments, glass fibers may account for between about 40% and about 45%, and polymer fibers may account for about 25% and about 30% of the total weight of the composite. In this or certain other of the disclosed ratios, the amount of polymer fiber incorporation may maintain a low-cost composite while still ensuring an adequate internal bond of the nonwoven so that the system does not delaminate.

The average fiber diameter for the glass fibers may range from about 6 to about 25 μm, and may also range from about 8 to about 20 μm, or about 10 to about 17 μm. The average length of glass fibers may range from about 0.12 inches to about 3 inches, and may also range from about 0.25 inches to about 1.5 inches, or about 0.25 inches to about 1.25 inches. The average fiber diameter for the polymer fibers may range from about 5 to about 30 μm, and may also range from about 8 to about 20 μm, or about 10 to about 18 μm. The average length of the polymer fibers may range from about 0.1 inches to about 2 inches, and may also range from about 0.12 inches to about 1 inch. The selection of fiber composition as well as fiber length and diameter may be made to produce a nonwoven fibrous web characterized by a specific machine direction to cross machine direction tensile ratio. For example, the nonwoven fibrous web utilized in the composite material may be characterized by a machine direction to cross machine direction tensile ratio of below or about 10 to 1, and may be characterized by a ratio of below or about 7 to 1, 6 to 1, 5 to 1, 4 to 1, 3 to 1, 2 to 1, 1.5 to 1, 1 to 1, etc.

The fiber blend webs may be bound together by use of a resin composition applied in order to saturate the web with the desired binder. The application of the resin in operation 110 may occur after the process of forming the nonwoven fibrous web. Exemplary processes to produce the web may include producing an aqueous slurry, such as a dilute aqueous slurry, of the glass and polymer fibers. The slurry may be deposited onto a moving screen forming wire to dewater the slurry and form a wet, nonwoven fibrous web. After forming the wet, uncured web, it may be delivered through a binder application station, or may be transferred to a second screen running through the binder application station, where the resin may be applied to the web. The resin may be applied to the fibrous web by any suitable means including, for example, air or airless spraying, padding, saturating, roll coating, curtain coating, beater deposition, coagulation or dip and squeeze application, etc. Excess binder, if present, may be removed to produce the desired binder level in the composite by the use of vacuum boxes coupled with the application station.

The web wet with resin may then be dried in operation 120. The belt on which the web is on, or after the web has been transferred to an additional belt may be transported through an oven station in which the resin may be dried but not fully cured. This operation may or may not also include an amount of pressure applied to the composite in order to produce a desired thickness. For example, heated air may be passed through or around the web to remove excess water and dry the resin. The heated air may be at any suitable temperature such as from about 100° F. to about 500° F., may be maintained at a temperature below the activation temperature to effect curing of the resin utilized. For example, if the resin is activated at a temperature of about 300° F., the drying operation may be performed below or about 300° F. for a duration suitable to effect drying but not substantial curing of the resin. The duration of the heat treatment can be any suitable period of time such as, for example, from about three seconds to five minutes or more, but may take less than or about three minutes, two minutes, or one minute in disclosed embodiments.

The resin utilized in the composite may include a thermosetting resin characterized by B-staged curing. The resin may be formaldehyde-free in disclosed embodiments, and may be produced from a carboxylic acid or a variety of polycarboxylates in conjunction with a polyol cross-linker in a condensation reaction. For example, acrylic and polyacrylic polymers such as polyacrylic acid may be used in embodiments along with one or more polyols. The polyol can be varied to include polyols from natural sources including reduced sugars, carbohydrates, or hydrolyzed fats, and may also include formulated polyols or polymeric polyols such as polyesters, or any source containing sufficient hydroxyl groups. In disclosed embodiments the resin compositions may also optionally contain other compounds including adhesion promoters, solvents, emulsifiers, pigments, fillers, anti-migration aids, coalescent aids, wetting agents, biocides, plasticizers, colorants, corrosion inhibitors, additional cross-linking agents, etc., or combinations of these components.

B-staged resins useful in the present compositions may undergo multiple stages of curing, such as a two-stage curing, before they are finally cured to form the composite materials. For example, the initial resin composition may be partially cured in the drying operation 120 at a first stage temperature as described above to produce a flexible, partially-hardened fiber web that may be cut, formed, or otherwise manipulated prior to the lamination operation 130. The nonwoven fibrous web may then be finally hardened in a second stage curing operation having a second stage temperature that may include a further application of heat and/or pressure. The partially-cured resin may be referred to as B-staged curable after the drying operation. Such a resin may be harder and stronger than the starting resin composition, but still capable of experiencing additional curing, hardening, and strengthening to form a fully-cured resin. A resin composition cured to be B-staged may undergo a phase transition from a liquid/solution phase of the initial composition to a gel or flexible solid phase. This may allow the presently described nonwoven fibrous webs to be cut, folded, rolled, or otherwise manipulated. Once dried, the fibrous web may be characterized by a certain area weight based on the included components, and may have an area weight of between about 2 and 10 lb./100 square feet of nonwoven, or may have an area weight of between about 4 and 8 lb., 5 and 7 lb., or 6 and 7 lb. in disclosed embodiments. The binder may account for greater than or less than about 40% of the total composite components by weight. For example, the binder may account for less than or about 30%, or between about 10% and about 50% by weight of the composite, about 20% and about 40%, or any specific percentage within any of these stated ranges. In disclosed embodiments, the binder may account for less than or about 50% by weight of the composite material, while the nonwoven fibrous web may account for greater than or about 50% by weight of the composite material. In disclosed embodiments, the binder may account for less than or about 40%, 30%, or 25% by weight of the composite material, while the nonwoven fibrous web may account for greater than or about 60%, 70%, or 75% by weight of the composite material.

Either before or after the dried web has been cut or formed to the desired size, the web may be subjected to the lamination process at operation 130 to fully cure the resin. The lamination process may occur at a second stage temperature higher than the first stage temperature, and the second stage temperature may also be above the melting point of the polymer fibers. The lamination operation may be performed by providing one or more layers of the dried web into a cycle press, flat platen press, roller press or any other suitable press that may additionally allow the application of or directly apply heat in addition to compression. The lamination may be at any suitable temperature such as from about 100° F. to about 500° F., and may be maintained at a temperature at or above the activation temperature to effect complete curing or cross-linking of the resin utilized. For example, if the resin is activated at a temperature of about 300° F., the drying operation may be performed above or about 300° F., 400° F., or 500° F. for a duration suitable to effect complete curing of the resin. The duration of the heat treatment can be any suitable period of time such as, for example, from about three seconds to five minutes or more, but may take less than or about three minutes, two minutes, one minute, thirty seconds, or ten seconds in disclosed embodiments.

Upon removal of the produced composite from the lamination process, such as removal from a press, the composite material may retain a substantially rigid shape despite that the composite may still be at a temperature above the melting point of the polymer fibers. Such an ability may in part be provided by the finally cured or C-staged resin utilized in the operation, which may allow the web to retain the rigidity after the lamination process by affording the partially-hardened fiber structure in the first stage curing, or B-stage. When the second stage curing occurs beyond the melting temperature of the polymer fibers, the fibers may be better contained in the matrix, and the final cross-linked composite produced may overcome any flexibility remaining from what may be still-flexible polymer fibers in the composite. Accordingly, such composites may be improved in comparison to conventional composites in that the rigid structure provided from the fully cured resin may be retained subsequently to the lamination process when the composite is still hot enough to have flexible polymer fibers. This may prevent sagging or other deformation that may occur in conventional composites.

After the composite material has been fully cured, structural panels may be formed utilizing the composite. For example, in optional operation 140, one or more layers of the laminated composite may be coupled on opposite sides of a core material to produce a structural panel. The core material may comprise an expanded foam, such as polystyrene or other polymer material, although other core material may include metal, plastics, wood including plywood, insulation sandwiched between any of these materials, or other materials that may provide a lightweight and/or insulated core. The methods may still also include applying a material or coating, such as a gel coating, to an outer surface of the laminated composite or web to produce a finish such as a Class A finish to the composite material. The laminated composite may be characterized by a substantially smooth surface, however the surface may not provide the glossy or mirror finish of Class A. The layers of material may be coupled with one another in a variety of known manners including adhesives and mechanical fixation devices.

Applying a gel coating to the laminated web may include first coupling an additional layer of material to a surface of the laminated web at optional operation 150. This additional material may be coupled with a surface of the laminated web opposite a surface coupled with the core material. In disclosed embodiments this additional layer of material may include an additional nonwoven glass fiber material. This layer of material may be saturated with the gel coating at optional operation 160. The gel coating may further extend beyond the thickness of the layer of material by a certain amount that may be greater than or less than 1 inch, 0.5 inches, 0.25 inches, etc.

The lamination operation may include laminating at least two layers of the dried web together to form the composite material. The lamination operation may also include laminating at least three, four, five, six, seven, eight, etc. or more layers together to produce the composite. The layers may be stacked prior to providing them to the lamination device, such as a press, and in disclosed embodiments one or more layers may be oriented in a fiber direction orthogonal to at least one other layer. Shims or other spacers may be provided in the press in order to ensure a specific thickness of the formed laminate. The formed laminate, depending on the number of layers, may be between about 1 mm and about 10 mm in disclosed embodiments. The laminate may be less than or about 7 mm, 5 mm, 3 mm, or 1 mm as well. In disclosed embodiments the layers may be alternated such that each layer has a fiber directional orientation orthogonal to a layer directly adjacent to that layer. After the multiple layers are laminated together, an additional layer of material, such as an additional nonwoven layer, may be coupled with a surface of the laminated web and then saturated with the gel coating to produce a Class A finish. These formed structural panels may be used in a variety of applications including mobile homes or other vehicles, and may take an additional form or forms such as those described with regards to FIGS. 2A-2B described below.

Figure 2A:
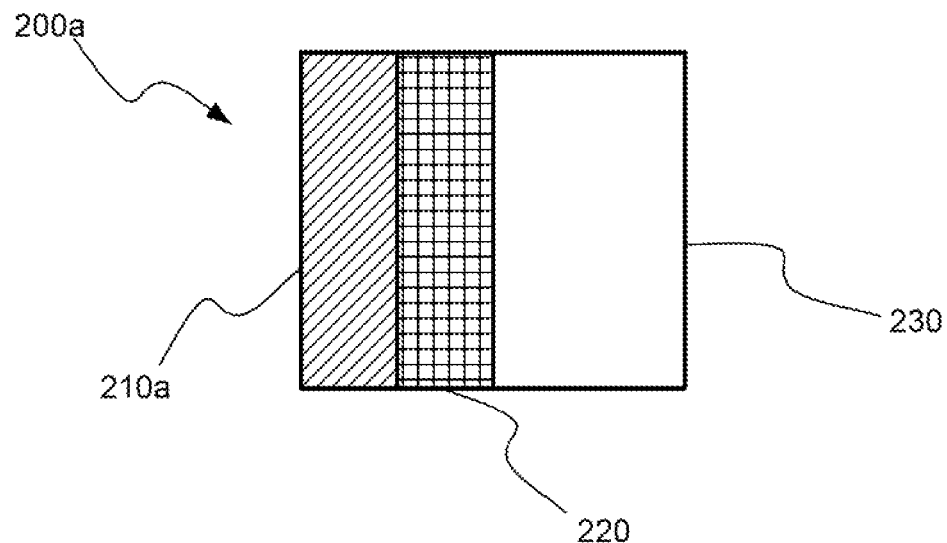
FIG. 2A illustrates a cross-sectional view of a structural panel including a composite material having a laminated nonwoven web according to embodiments of the present technology.

Turning to FIG. 2A, a cross-sectional view of a structural panel 200a is shown including a composite material having a laminated nonwoven web according to embodiments of the present technology. The structural panel may include a core material 230 with which a nonwoven laminate material 220 may be coupled. A first surface of the nonwoven laminated material 220 may be coupled with the first surface of the core material 230, and in disclosed embodiments a second nonwoven laminated material 220 may be coupled with a second surface of the core material 230 opposite the first surface. The nonwoven laminated material may include a nonwoven fibrous web having a combination of glass fibers and polymer fibers as well as a B-staged resin characterized by a curing temperature above the melting temperature of the polymer fibers. The nonwoven laminated material may be formed in accordance with the methods and materials as previously described.

A gel coat 210a, such as a polyester gel coat, may be applied to a second surface of the nonwoven laminate material 220 opposite the first surface of the nonwoven laminate material coupled with the core material 230. In disclosed embodiments, a reinforcement layer may be coupled with the second surface of the nonwoven laminated material along the second surface identified above. The gel coat may then be applied to the reinforcement layer, such as an additional nonwoven fibrous layer, and the gel coat may saturate the reinforcement layer, and may additionally extend beyond the thickness of the reinforcement layer from the nonwoven laminated material. In embodiments the nonwoven laminated material may include at least two layers of the nonwoven fibrous web laminated together. The laminated material may also include at least three, four, five, six, seven, etc. or more layers of the nonwoven fibrous web laminated together. The layers of fibrous web in such a multilayer composite may include at least one layer of the composite having a fiber directional orientation that is orthogonal to at least one other layer of the nonwoven fibrous web. The nonwoven fibrous web utilized in the structural panel may be characterized by a machine direction to cross machine direction tensile ratio of below or about 10 to 1, and may be characterized by a ratio of below or about 7 to 1, 6 to 1, 5 to 1, 4 to 1, 3 to 1, 2 to 1, 1.5 to 1, 1 to 1, etc.

Figure 2B:
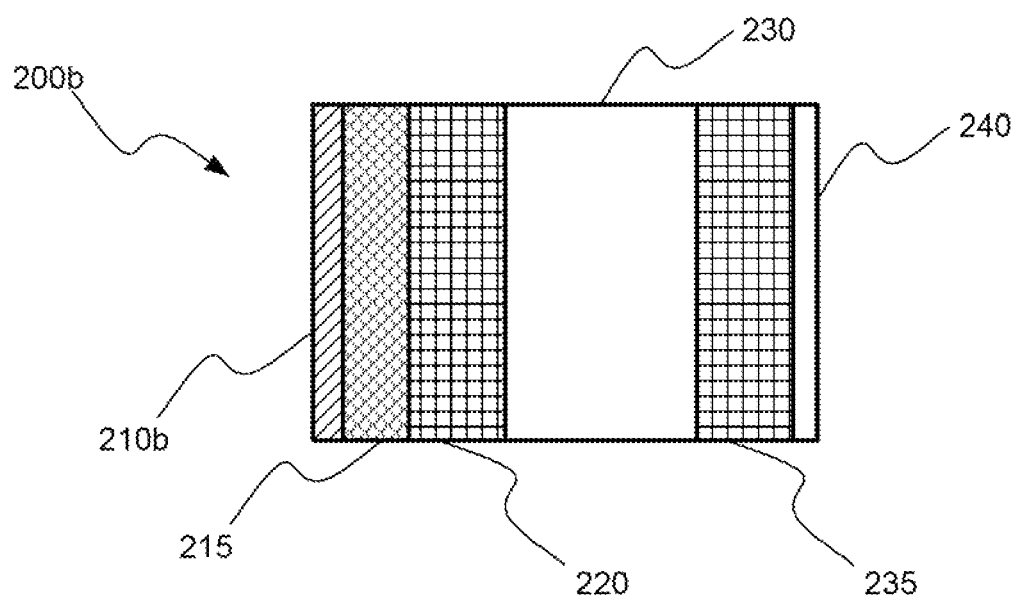
FIG. 2B illustrates another cross-sectional view of a structural panel including a composite material having a laminated nonwoven web according to embodiments of the present technology.

FIG. 2B illustrates another cross-sectional view of a structural panel 200b including a composite material having a laminated nonwoven web according to embodiments of the present technology. The structural panel 200b may include a core 230 from one or more of the materials as previously described, and opposite surfaces of the core material 230 may be coupled with layers of the nonwoven laminated material 220 and 235. The nonwoven laminated material may be similar to any of the previously described nonwoven laminated materials, and may include a nonwoven fibrous web including a combination of glass fibers and polymer fibers as well as a B-staged resin characterized by a curing temperature above the melting temperature of the polymer fibers. The nonwoven laminated material or composite may include multiple layers of nonwoven fibrous web laminated together in disclosed embodiments. The individual layers may be similarly oriented or may be oriented such that at least one of the nonwoven fibrous web layers has a fiber directional orientation orthogonal to at least one other layer of the nonwoven fibrous web.

A reinforcement layer 215, such as an additional nonwoven layer, may be coupled with the second surface of the nonwoven material opposite the first surface of the nonwoven material coupled with the core. This reinforcement layer may be saturated with a gel coat, such as a polyester gel coat 210b, that may additionally extend beyond the width of the reinforcement layer 215 it saturates. In this way, the gel coat 210b may provide a smooth, glossy surface that provides a Class A finish to an outer surface of the structural panel. On a second surface of the nonwoven laminated material layer 235 opposite the first surface coupled with the core material may be applied a surface treatment 240. The surface treatment 240 may include wallpaper, paneling, paint, or other surface treatments. This completed structural panel may be utilized as a structural panel for a mobile home or other vehicle. Compared to other conventional technology, such a structural panel may provide improved weather resistance in a relatively low-cost format that may also provide a degree of water resistance of interior layers not found in conventional components. The fibers utilized in the web may have a lower porosity than long fiber composites, which may additionally aid in limiting or reducing water absorption into the composite.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the disclosed embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "a fibrous web" includes a plurality of such webs, and reference to "the core" includes reference to one or more cores and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or steps, but they do not preclude the presence or addition of one or more other features, integers, components, steps, acts, or groups.

What is claimed is:

1. A method of making a composite material, the method comprising:
    applying a resin to a nonwoven fibrous web, wherein the nonwoven fibrous web comprises a combination of glass fibers and polymer fibers;
    drying the web at a first stage temperature at or below a curing temperature of the resin for a time sufficient to substantially dry but not substantially cure the resin;
    laminating the web and a first material at a second stage temperature sufficient to fully cure the resin to produce the composite material, wherein the second stage temperature is above the melting point of the polymer fibers, and wherein the resin causes the composite material to retain a substantially rigid shape upon completion of the laminating operation;
    coupling a layer of a second material to a surface of the composite material; and
    saturating the layer of a second material with a gel coat to produce a Class A finish to the composite material.

2. The method of claim 1, wherein the nonwoven fibrous web comprises greater than 50% by weight of the composite material.

3. The method of claim 2, wherein the glass fibers comprise greater than 40% by weight of the composite material.

4. The method of claim 1, wherein the nonwoven fibrous web is characterized by a machine direction to cross machine direction tensile ratio of below or about 2 to 1.

5. The method of claim 1, wherein the gel coat further extends beyond the thickness of the layer of a second material.

6. The method of claim 1, wherein the layer of a second material comprises a nonwoven glass fiber material.

7. The method of claim 1, further comprising coupling a layer of the composite material to two opposite sides of a core material to produce a structural panel.

8. The method of claim 1, wherein the laminating operation comprises laminating at least two layers of web together to form the composite material.

9. The method of claim 8, wherein one of the at least two layers is at a fiber directional orientation orthogonal to another of the at least two layers.

10. A method of making a composite material, the method comprising:
    applying a resin to a nonwoven fibrous web, wherein the nonwoven fibrous web comprises a combination of glass fibers and polymer fibers;
    drying the web at a first stage temperature at or below a curing temperature of the resin for a time sufficient to substantially dry but not substantially cure the resin;
    laminating at least two layers of the web at a second stage temperature sufficient to fully cure the resin to produce the composite material, wherein one of the at least two layers is at a fiber directional orientation orthogonal to another of the at least two layers, wherein the second stage temperature is above the melting point of the polymer fibers, and wherein the resin causes the composite material to retain a substantially rigid shape upon completion of the laminating operation;
    coupling a layer of material to a surface of the composite material; and
    saturating the layer of material with a gel coat.

11. The method of claim 10, further comprising coupling a layer of the composite material to two opposite sides of a core material to produce a structural panel.

12. The method of claim 10, wherein the glass fibers comprise greater than 40% by weight of the composite material.

13. The method of claim 10, wherein the nonwoven fibrous web is characterized by a machine direction to cross machine direction tensile ratio of below or about 2 to 1.

14. A method of making a composite material, the method comprising:
   applying a resin to a nonwoven fibrous web, wherein the nonwoven fibrous web comprises a combination of glass fibers and polymer fibers;
   drying the web at a first stage temperature at or below a curing temperature of the resin for a time sufficient to substantially dry but not substantially cure the resin;
   laminating at least two layers of the web at a second stage temperature sufficient to fully cure the resin to produce the composite material, wherein the second stage temperature is above the melting point of the polymer fibers, and wherein the resin causes the composite material to retain a substantially rigid shape upon completion of the laminating operation;
   coupling a layer of a nonwoven glass fiber material to a surface of the composite material; and
   saturating the layer of nonwoven glass fiber material with a gel coat to produce a Class A finish to the composite material.

15. The method of claim 14, further comprising coupling a layer of the composite material to two opposite sides of a core material to produce a structural panel.

16. The method of claim 14, wherein the glass fibers comprise greater than 40% by weight of the composite material.

17. The method of claim 14, wherein the nonwoven fibrous web is characterized by a machine direction to cross machine direction tensile ratio of below or about 2 to 1.

* * * * *